United States Patent
Okumura et al.

(10) Patent No.: US 9,489,737 B2
(45) Date of Patent: Nov. 8, 2016

(54) OBJECT DETECTION APPARATUS AND METHOD

(71) Applicant: KABUSHIKI KAISHA TOSHIBA, Minato-ku, Tokyo (JP)

(72) Inventors: Mayu Okumura, Katsuragi (JP); Tomoki Watanabe, Kawasaki (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 272 days.

(21) Appl. No.: 14/039,499

(22) Filed: Sep. 27, 2013

(65) Prior Publication Data

US 2014/0093129 A1 Apr. 3, 2014

(30) Foreign Application Priority Data

Oct. 1, 2012 (JP) ................................ 2012-219715

(51) Int. Cl.
*G06T 7/00* (2006.01)
*G06T 7/20* (2006.01)

(52) U.S. Cl.
CPC ............ *G06T 7/004* (2013.01); *G06T 7/0022* (2013.01); *G06T 7/0026* (2013.01);
(Continued)

(58) Field of Classification Search
CPC . G06T 7/0022; G06T 7/0024; G06T 7/0026; G06T 7/0028; G06T 7/0038; G06T 7/004; G06T 7/0042; G06T 7/2006; G06T 7/2013; G06T 7/204; G06T 7/2046; G06T 2207/10016; G06T 2207/30196; G06T 2207/30201
See application file for complete search history.

(56) References Cited

U.S. PATENT DOCUMENTS 6,493,041 B1 * 12/2002 Hanko ................... H04N 5/144
 348/169
6,940,545 B1 * 9/2005 Ray ..................... G06K 9/00228
 348/207.99

(Continued)

FOREIGN PATENT DOCUMENTS

JP 2006508461 A 3/2006
JP 2008262331 A 10/2008
JP 2010-170201 A 8/2010

OTHER PUBLICATIONS

Watanabe, et al.; "Co-occurrence Histograms of Oriented Gradients for Human Detection"; IPSJ Transactions on Computer Vision and Applications, vol. 2, pp. 39-47, Mar. 2010.

(Continued)

*Primary Examiner* — Manav Seth
(74) *Attorney, Agent, or Firm* — Holtz, Holtz & Volek PC (57) ABSTRACT

According to one embodiment, an object detection apparatus includes an acquisition unit, a first detector, a determination unit, and a second detector. The acquisition unit acquires frames in a time-series manner. The first detector detects a predetermined object in each of the frames. The determination unit stores detection results corresponding to the frames, compares a first detection result corresponding to a first frame of the frames with a second detection result corresponding to a second frame of the frames, and determines whether false negative of the predetermined object exists in the second frame. The second detector detects the predetermined object in the second frames when it is determined that false negative of the predetermined object exists. The second detector differs in performance from the first detector.

20 Claims, 6 Drawing Sheets

(52) U.S. Cl.
CPC ............ *G06T 7/0028* (2013.01); *G06T 7/204* (2013.01); *G06T 7/2006* (2013.01); *G06T 7/2093* (2013.01); *G06T 2207/10016* (2013.01); *G06T 2207/30201* (2013.01)

(56) References Cited

U.S. PATENT DOCUMENTS

| | | | | |
|---|---|---|---|---|
| 6,954,857 | B2 * | 10/2005 | Pelly | G06T 1/0078 382/100 |
| 7,583,294 | B2 * | 9/2009 | Ray | G06K 9/00228 348/222.1 |
| 7,859,564 | B2 * | 12/2010 | Kelly, III | G06K 9/00771 348/143 |
| 8,224,029 | B2 * | 7/2012 | Saptharishi | G06K 9/00771 382/103 |
| 8,468,183 | B2 * | 6/2013 | Cheung | G06F 17/30029 348/14.02 |
| 8,655,020 | B2 * | 2/2014 | Saptharishi | G06K 9/00771 382/103 |
| 8,660,238 | B1 * | 2/2014 | Annis | G01V 5/0091 378/57 |
| 8,842,213 | B2 * | 9/2014 | Tomita | G02B 7/28 348/345 |
| 8,842,881 | B2 * | 9/2014 | Gao | G06K 9/629 382/103 |
| 8,873,813 | B2 * | 10/2014 | Tadayon | G06K 9/00 382/118 |
| 8,888,052 | B2 * | 11/2014 | Baldwin | B61L 29/28 246/130 |
| 9,076,042 | B2 * | 7/2015 | Saptharishi | G06K 9/00771 |
| 9,111,130 | B2 * | 8/2015 | Heckman | G06K 9/00248 |
| 2004/0246336 | A1 * | 12/2004 | Kelly, III | G06K 9/00771 348/143 |
| 2005/0129277 | A1 * | 6/2005 | Porter | G06K 9/00228 382/103 |
| 2006/0104487 | A1 * | 5/2006 | Porter | G06K 9/00228 382/118 |
| 2013/0050502 | A1 * | 2/2013 | Saito | G06T 7/20 348/169 |
| 2014/0254880 | A1 * | 9/2014 | Srinivasan | G06T 7/004 382/106 |
| 2014/0354859 | A1 * | 12/2014 | Noyes | H04N 5/2357 348/241 |

OTHER PUBLICATIONS

Mita, et al.; "Joint Haar-like Features for Face Detection"; IEEE International Conference on Computer Vision, pp. 1619-1626, 2005.
Crammer, et al.; "Adaptive Regularization of Weight Vectors"; Neural Information Processing Systems; 2009, pp. 1-9.
Japanese Office Action (and English translation thereof) dated Aug. 23, 2016, issued in counterpart Japanese Application No. 2012-219715.

* cited by examiner

OBJECT DETECTION APPARATUS AND METHOD

CROSS-REFERENCE TO RELATED APPLICATIONS

This application is based upon and claims the benefit of priority from Japanese Patent Application No. 2012-219715, filed Oct. 1, 2012, the entire contents of which are incorporated herein by reference.

FIELD

Embodiments described herein relate generally to an object detection apparatus for detecting a target object in an image, and a detection method employed in the apparatus.

BACKGROUND

There is a conventional technique of detecting a target object in an image using two detectors different in performance. This technique reduces the number of false positives that may occur when a detector storing data obtained by previous learning cannot completely be adapted to the circumstances of its installed place. In the technique, first detection is performed to detect a target object in the whole image, using a first detector, and then second detection is performed on the first detection result, using a second detector. By setting, as a detection result, the object detected by both detectors, detection of an object that should not be detected is suppressed.

DETAILED DESCRIPTION

Object detection apparatuses and their detection methods according to embodiments will be described in detail with reference to the accompanying drawings. In the embodiments, like reference numbers denote like elements, and duplicate description will be avoided.

Since the second detector is used only for the first detection result, there is a problem that the number of objects that should be detected but are not detected by the first detector (i.e., the number of occurrences of false negative) is not reduced.

It is an object of the embodiments to provide an object detection apparatus and method capable of realizing object detection with the occurrences of false negative reduced.

In general, according to one embodiment, a object detection apparatus includes an acquisition unit, a first detector, a determination unit, and a second detector. The acquisition unit acquires a plurality of frames in a time-series manner. The first detector detects a predetermined object in each of the frames. The determination unit stores detection results corresponding to the frames, compares a first detection result corresponding to a first frame of the frames with a second detection result corresponding to a second frame of the frames acquired after the first frame, and determines whether false negative of the predetermined object has occurred in the second frame. The second detector detects the predetermined object in each of the frames when it is determined that false negative of the predetermined object has occurred. The second detector differs in performance from the first detector.

First Embodiment

Referring first to the block diagram of FIG. 1, a description will be given of an object detection apparatus 100 according to a first embodiment.

The object detection apparatus 100 of the first embodiment includes an image acquisition unit 101, a first detector 102, a false negative determining unit 103, and a second detector 104. The object detection apparatus 100 may include a detection result output unit 111. In the embodiments described below, although a detection target (denoted by, for example, reference number 201) is a person, it is not limited to it, but may be an object or a part thereof. For instance, the detection target 201 is a face, a hand, a vehicle, a bicycle, a traffic sign, a dog, etc. The detection result output unit 111 receives detection results from the first and second detectors 102 and 104, and outputs them.

The image acquisition unit 101 is a camera for photographing its surroundings and providing time-series image data in which frames are arranged in a time-series manner. A camera capable of detecting normal visible light is assumed as the image acquisition unit 101. However, the image acquisition unit 101 may be an infrared camera capable of photographing dark places.

Figure 2:
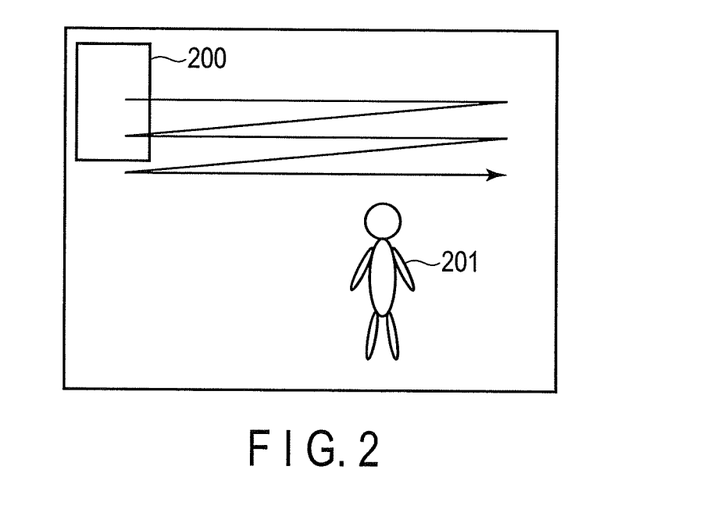
FIG. 2 is a view illustrating a state in which a detection window field is scanning an image.

The first detector 102 detects the position of the detection target 201 in the image acquired by the image acquisition unit 101. For instance, in the first detector 102, a detection window field 200 is made to scan the whole image acquired by the image acquisition unit 101 as shown in FIG. 2, thereby determining whether a detection target 201 exists within the detection window field 200, and outputting the determination result. More specifically, the first detector 102 outputs, as a detection result, the position of the detection target 201 in the image. The first detector 102 detects the position of the detection target 201 in the image, using the technique disclosed in, for example, Tomoki Watanabe, Satoshi Ito and Kentaro Yokoi: "Co-occurrence Histograms of Oriented Gradients for Human Detection," IPSJ Transactions on Computer Vision and Applications, Vol. 2, pp.

39-47 (2010). Although in the embodiments described below, the detection window field 200 is a rectangular field, it is not limited to this, but may have an arbitrary shape.

The false negative determining unit 103 stores the detection results of previous frames, compares the detection result of a first frame with that of a second frame other than the first frame, and determines whether a target not detected exists. More specifically, the false negative determining unit 103 compares the detection result of a previously stored frame with the detection result of the first detector 102 associated with a current frame, thereby determining whether a detection target not detected exists in the current frame, based on the detection result of the first detector 102. The previous frame usually indicates the frame immediately before the current frame. However, the previous frame may be the frame that precedes to the current frame by an arbitrary number of frames. Further, based on, for example, the frame rate, the moving speed of the detection target 201 or whether the image acquisition unit 201 is fixed, it may be determined by what number of frames the frame to be set as the previous frame should precede to the current frame. For instance, when a slowly moving detection target 201 is captured by the image acquisition unit 101 in the fixed state, and is detected by the detector 102, the frame sufficiently before the current frame may be set as the previous frame, since changes in frames are small. Further, when a slowly moving detection target 201 is captured by the image acquisition unit 101 not in the fixed state, the previous frame may be set within a range in which the detection target 201 falls within the frames, in accordance with the frame rate, since changes in frames vary depending upon the frame rate. If the frame rate is low, the previous frame may be set to the frame immediately before or slightly before the current frame. In contrast, if the frame rate is high, the previous frame may be set to a frame before the current frame on condition that the detection target 201 falls within the frame.

The detection result of the previous frame indicates values (or a value) associated with the detection results of the first and second detectors 102 and 104 (or the detection result of one of the detectors). The detection result of the previous frame is represented by a certain index. For instance, it is represented by the position of the detection target 201, the height or width of the detection field, or a color histogram in the detection field.

The false negative determining unit 103 may determine false negative based on, for example, the number of detection results of "previous" frames and the detection results of the first detector 102 associated with "current" frames. In this case, if the number of the detection results of the first detector 102 associated with "current" frames is smaller than that of the detection results of "previous" frames, it is determined that false negative exists.

Alternatively, the false negative determining unit 103 may determine false negative based on, for example, the distance between the detection position of the detection result of the previous frame and that of the detection result of the first detector 102 associated with the current frame. If the distance between them is larger than a predetermined threshold, it is determined that false negative exists. For instance, the display between the detection positions is given by the following mathematical expression:

$$\sqrt{(x_t - x_{t-1})^2 + (y_t - y_{t-1})^2}$$

where $(x_{t-1}, y_{t-1})$ represents the central coordinates of the rectangular detection result of the previous frame, and $(x_t, y_t)$ represents the central coordinates of the rectangular detection result of the first detector associated with the current claim.

Figure 3:
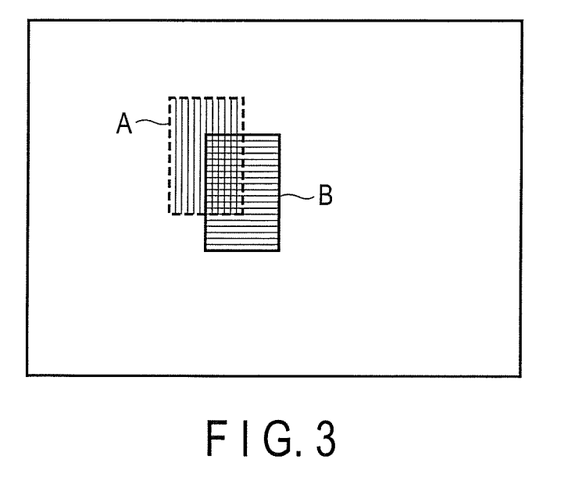
FIG. 3 is a view illustrating the ratio of overlap.

Yet alternatively, the false negative determining unit 103 may determine false negative by comparing, with a threshold, the ratio (overlap ratio) of the overlapping region between the area including a detection target 201 as the stored detection result of the previous frame, and the area including a detection target 201 as the detection result of the first detector 102 associated with the current frame, to one of those areas, or to the sum of those areas. If the overlap ratio is lower than a predetermined threshold, it is determined that false negative exists. FIG. 3 shows the above overlap ratio. Assuming that the area including the detection target 201 corresponding to the detection result of the previous frame is A, and the area including the detection target 201 corresponding to the detection result of the first detector 102 associated with the current frame is B, the overlap ratio R is given by the following equation:

$$R = \frac{A \cap B}{A \cup B} \times 100(\%)$$

In other words, the overlap ratio is the ratio of the area as the product set of a first area and a second area to the sum set of the first and second areas, the first area including the detection target detected in the previous frame, the second area including the detection target detected in the current frame.

Yet alternatively, the false negative judging unit 103 may determine false negative by comparing, with a threshold, the similarity in color between the stored detection result of the previous frame and the detection result of the first detector 102 associated with the current frame. If the similarity in color between the detection result of the previous frame and that of the first detector 102 associated with the current frame is lower than a predetermined threshold, it is determined that false negative exists. For instance, the similarity S between two normalized color histograms is given by the following equation:

$$S = \sum_{u=1}^{m} \sqrt{p_u q_u}$$

where p is the color histogram of the target area in the detection result of the previous frame, q is the color histogram of the target area in the detection result of the first detector 102 associated with the current frame, $p_u$ is each bin of the color histogram p, and $q_u$ is each bin of the color histogram q, the sum of the bin values of each histogram being normalized to 1.

Alternatively, the false negative determining unit 103 may determine false negative by combining the above-mentioned indexes.

The second detector 104 differs in performance from the first detector 102, and is configured to detect the position of the detection target 201 based on the image captured by the image acquisition unit 101. Difference in performance indicates difference in detection performance (for example, one of the detectors can detect a target, and the other cannot detect it, or vice versa) resulting from difference in parameters used for detection (such as resolution, image division size, the number of dimensions), difference in feature amounts used for detection (such as HOG, CoHOG, LBP, edgelet, Haar, Joint-Haar, etc.), difference in learning method used for learning by detectors (such as SVM, boosting, random trees, k-NN, Perceptron, Passive Aggressive, AROW, Confidence weighted, etc.), and/or difference in parts included in detection targets and used for detection (for example, upper body, lower body, face, etc., if the target is a human, or front side, rear side, upper side, etc., if the target is a vehicle).

Figure 4:
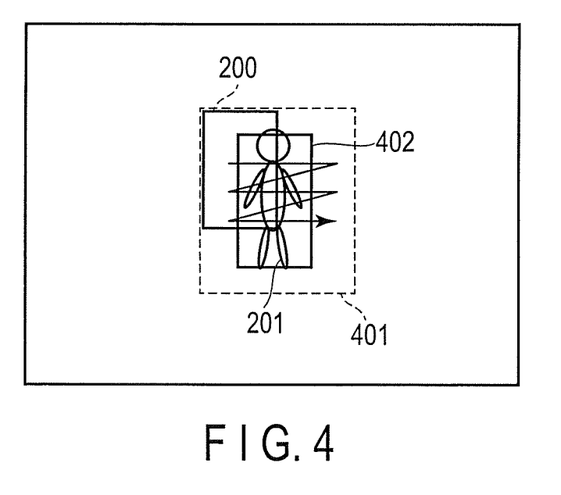
FIG. 4 is a view illustrating a state in which the detection window field is scanning the detection result neighboring area of a preceding frame.

As shown in, for example, FIG. 4, the second detector 104 adds a margin area of a predetermined size to each of the upper, lower, right and left sides of a rectangular field 402 detected in the previous frame, thereby setting a detection result peripheral field 401 in the previous frame, if the false negative determining unit 103 determines that false negative exists in the detection result of the first detector 102 associated with the current frame. The thus-set detection result peripheral field 401 is scanned with the detection window field 200, thereby detecting the position of the detection target 201 in the image. The second detector 104 may employ parameters different from those of the first detector 102. For instance, the technique, disclosed in the above-mentioned document Tomoki Watanabe, Satoshi Ito and Kentaro Yokoi: "Co-occurrence Histograms of Oriented Gradients for Human Detection," IPSJ Transactions on Computer Vision and Applications, Vol. 2, pp. 39-47 (2010)," may be applied to the first detector 102. In this case, the first detector 102 divides an image into 6 pixels×6 pixels to produce a luminance gradient co-occurrence histogram. On the other hand, the second detector 104 is constructed to divide an image into 4 pixels×4 pixels to produce a co-occurrence histogram of oriented gradients.

Further, the second detector 104 may employ a learning method different from that of the first detector 102. For instance, if the first detector 102 employs the technique, disclosed in the above-mentioned document, Tomoki Watanabe, Satoshi Ito and Kentaro Yokoi: "Co-occurrence Histograms of Oriented Gradients for Human Detection," IPSJ Transactions on Computer Vision and Applications, Vol. 2, pp. 39-47 (2010)," the second detector may employ the technique disclosed in T. Mita, T. Kaneko and O. Hori, "Joint Haar-like Features for Face Detection," IEEE International Conference on Computer Vision, pp. 1619-1626, 2005.

Yet further, the second detector 104 may use a detection target different from that of the first detector 102. If, for example, the first detector 102 is adapted to detect the upper body of a person, the second detector 104 may be adapted to detect the lower body of the person. Similarly, the first detector 102 may detect the face of a person, and the second detector 104 may detect the whole body of the person.

Figure 1:
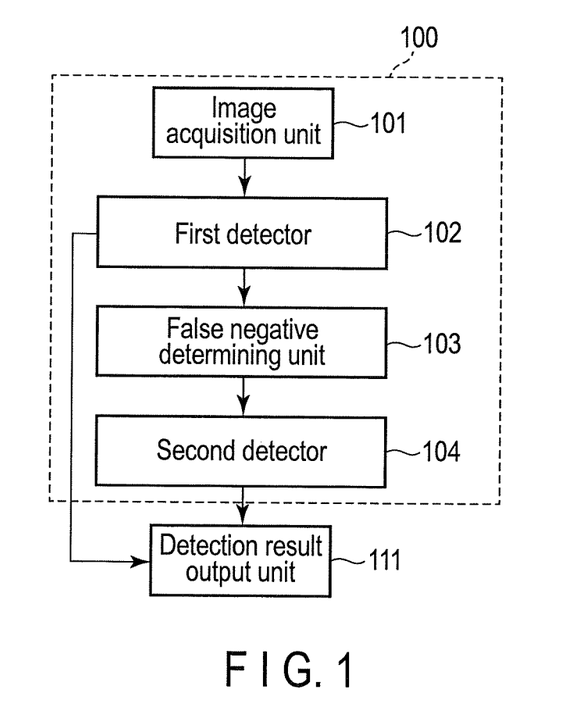
FIG. 1 is a block diagram illustrating the configuration of an object detection apparatus according to a first embodiment.
Figure 5:
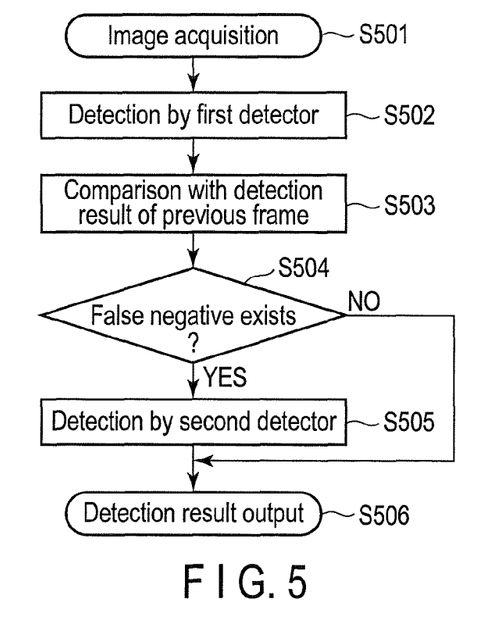
FIG. 5 is a flowchart illustrating the operation of the object detection apparatus according to the first embodiment.

Referring now to FIGS. 1 and 5, the operation of the object detection apparatus according to the first embodiment will be described. FIG. 5 is a flowchart useful in explaining the operation of the object detection apparatus.

Firstly, the image acquisition unit 101 picks up an image by capturing (S501), and then the first detector 102 scans the image with the detection window field 200 to thereby determine whether a detection target 201 exists in the detection window field 200, and determine the position of the detection target 201 if it exists (S502).

Subsequently, the false negative determining unit 103 compares the detection result of the previous frame with that of the first detector 102 associated with the current frame, thereby determining whether false negative exists (S503). If the false negative determining unit 103 determines that false negative does not exist in the detection result of the first detector 102 associated with the current frame (S504), the detection result output unit 111 outputs the detection result of the first detector 102, which is the termination of this process (S506).

In contrast, if the false negative determining unit 103 determines that false negative exists in the detection result of the first detector 102 associated with the current frame (S504), the detection result peripheral field 401 is set to include the rectangular field 402 of the previous frame, and the detection result peripheral field 401 is scanned with the detection window field 200 to detect whether the detection target 201 exists in the detection window field 200, using the second detector 104 (S505). After that, the detection result output unit 111 outputs the detection results of the first and second detectors 102 and 104, which is the termination of the process (S506).

As described above, in the object detection apparatus of the first embodiment, when false negative exists in the detection result of the first detector 102, the number of the cases where false negative exists can be reduced by applying the second detector 104 to the detection result peripheral region of the previous frame.

In the above-described first embodiment, it is determined whether false negative exists in the detection result of the first detector, and if it is determined that false negative exists, the number of occurrences of false negative can be reduced using the second detector different in performance from the first detector.

Second Embodiment

Figure 6:
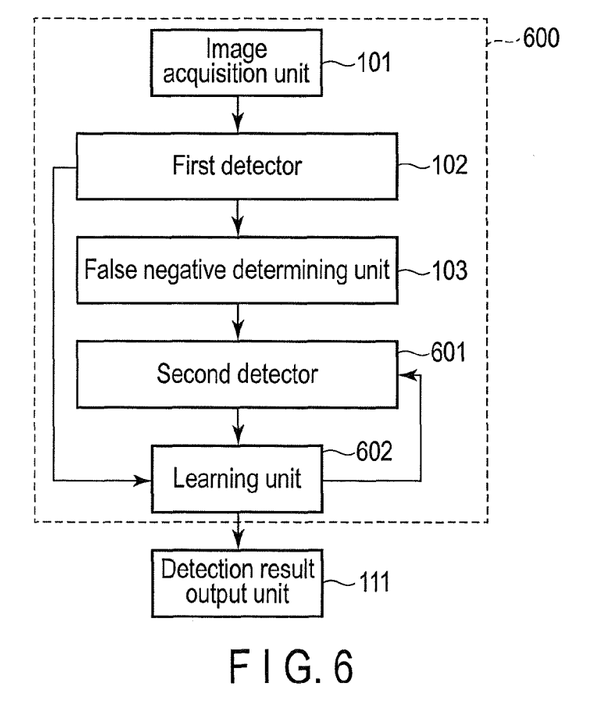
FIG. 6 is a block diagram illustrating the configuration of an object detection apparatus according to a second embodiment.

An object detection apparatus 600 according to a second embodiment differs from the first embodiment in that the former additionally comprises a learning unit 602. Further, a second detector 61 incorporated in the apparatus 600 differs from the second detector 104 of the first embodiment in that data is fed back from the learning unit 602 to the detector 601.

Referring then to FIG. 6, a description will be given of the object detection apparatus 600 according to the second embodiment.

Figure 7:
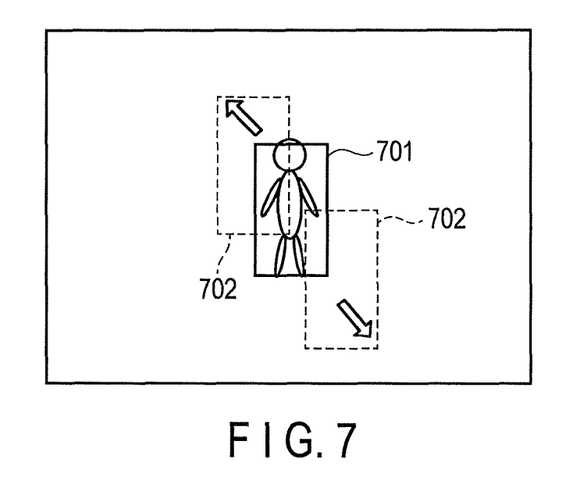
FIG. 7 is a view useful in explaining collection of positive data and negative data.

The learning unit 602 determines positive data and negative data based on the image in the current frame acquired from the image acquisition unit 101, collects them, and updates, using feature calculated from the collected data, parameters called as a dictionary for enabling the second detector 601 to detect the detection target 201. The learning unit 602 stores the parameters. The positive data and the negative data are determined using the detection result of the first detector 102 and that of the second detector 601 (or the detection result of one of the detectors). For example, as shown in FIG. 7, the learning unit 602 sets, as positive data, feature calculated from a field 701 corresponding to the detection result of the first detector 102 and that of the second detector 601 (or corresponding to the detection result of one of the detectors). Further, the learning unit 602 sets, as negative data, feature calculated from a field 702 that is obtained by upward, downward, rightward or leftward shifting the field 701 by a randomly set value or values. For instance, assuming that the coordinates of a point in the field 701 are expressed as (Xr, Yr), the coordinates (X, Y) of a point in the field 702 for the negative data shifted upward and leftward are given by the following equations:

$$X = X_r + \delta_1$$

$$Y = Y_r + \delta_2$$

where $\delta_1$ and $\delta_2$ are randomly set values. The positive data indicates the feature calculated from the field 701 including the detection target 201, while the negative data indicates the feature calculated from the field 702 that does not contain the detection target 201 or contains part of the detection target 201. Based on the positive and negative data, the boundary line (in general, a hyperplane serving as a boundary and depending on the dimension of feature amounts), which divides the space defined using the feature as variables, into a positive data space and a negative data space, can be determined.

To calculate the feature, the technique disclosed in, for example, the above-mentioned document, Tomoki Watanabe, Satoshi Ito and Kentaro Yokoi: "Co-occurrence Histograms of Oriented Gradients for Human Detection," IPSJ Transactions on Computer Vision and Applications, Vol. 2, pp. 39-47 (2010)." Further, to update the dictionary, a method called online learning is used. For instance, the method disclosed in Koby Crammer, Arex Kulesza, Mark Dredze: "Adaptive Regularization of Weight Vectors," Neural Information Processing Systems (2009).

In the online learning, the learning unit 602 updates parameters based on the detection results of the first and second detectors 102 and 601 associated with the image acquired by the image acquisition unit 101. Under the installation environment and under, for example, different illumination conditions, the image acquisition unit 101 acquires a large number of various images, and the learning unit 602 obtains, by learning, various types of data associated with the images, whereby parameters suitable for detection under the installation environment of the acquisition unit 101 can be obtained.

The second detector 601 acquires an updated dictionary (updated parameters) from the learning unit 602, and detects the detection target 201 using the parameters. The detection method employed in the learning unit 602 is the same as that used in the first or second detector of the first embodiment.

Figure 8:
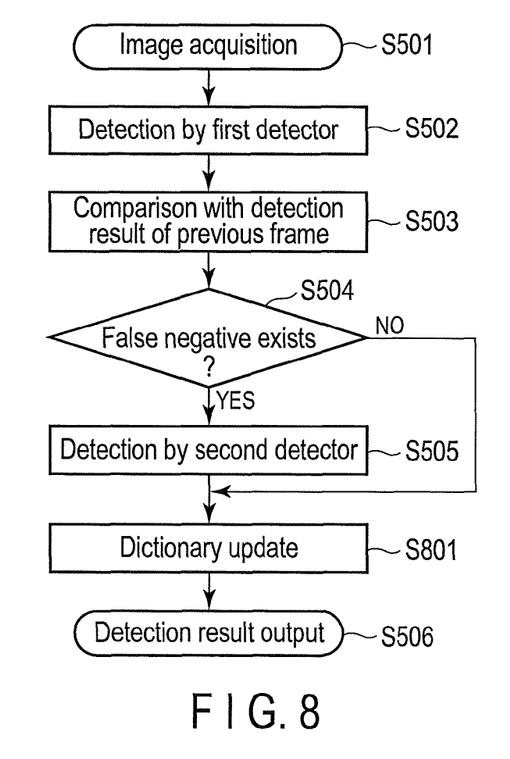
FIG. 8 is a flowchart illustrating the operation of the object detection apparatus according to the second embodiment.

Referring then to FIG. 8, the operation of the object detection apparatus of the second embodiment will be described. In FIG. 8, elements similar to those of FIG. 5 are denoted by corresponding reference numbers, and no detailed description will be given thereof. The operation of the object detection apparatus of the second embodiment differs from that of the first embodiment only in that the former additionally includes the step of updating the dictionary (S801).

In the updating of the dictionary (S801), when the detection target 201 is detected by the first detector 102 and/or the second detector 601, the learning unit 602 calculates feature from the field 701 corresponding to the detection result, and its peripheral field 702, thereby updating the dictionary.

In the above-described second embodiment, since even an object, which cannot be detected from beforehand prepared data because, for example, its illumination condition differs from a preset condition, can be detected by updating the dictionary, the number of occurrences of undetection can be reduced.

Third Embodiment

Figure 9:
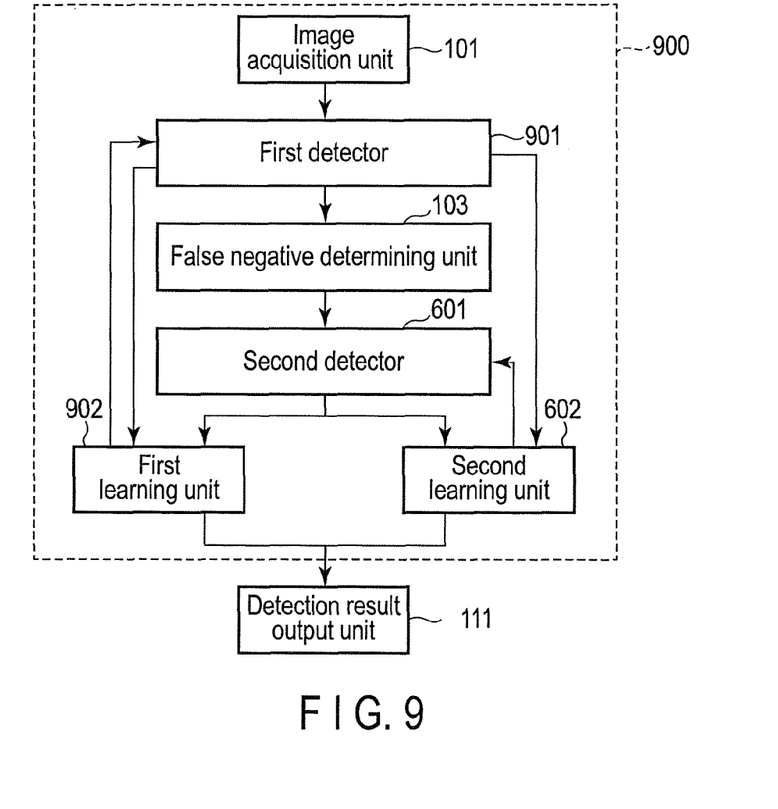
FIG. 9 is a block diagram illustrating the configuration of an object detection apparatus according to a third embodiment.

An object detection apparatus 900 according to a third embodiment will now be described. The object detection apparatus 900 differs from the first embodiment in that the former comprises a first learning unit 902 and a second learning unit 602, in addition to the elements of the first embodiment. Further, since a first detector 901 and a second detector 601 incorporated in the third embodiment differ from the first and second detectors of the first embodiment in that the data is fed back to the detectors 901 and 601 from the first and second learning units 902 and 602, respectively.

In the third embodiment, the first and second detectors 901 and 601 differ from each other in detection performance due to a difference in parts (the upper and lower bodies of a person, the whole portion of a vehicle, the front portion of the vehicle, etc.) of the detection target used for detection. For instance, the first detector 901 detects the detection target using the feature of the upper body of a person, while the second detector 601 detects the detection target using the feature of the lower body of the person.

Figure 10:
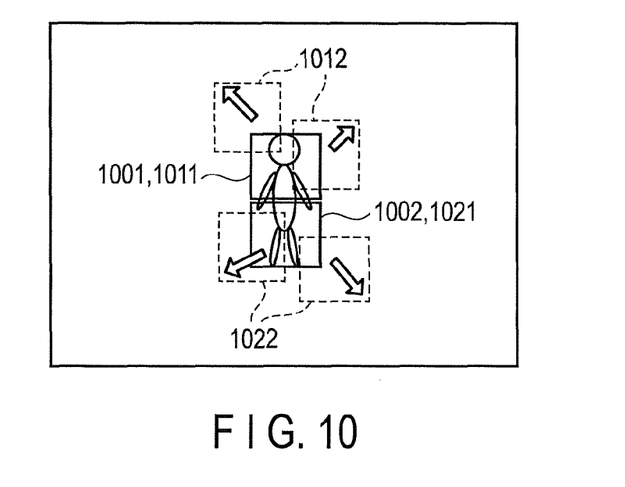
FIG. 10 is a view useful in explaining collection of positive data and negative data in the third embodiment.

The first learning unit 902 determines and collects, from the image of the current frame obtained by the image acquisition unit 101, positive and negative data used by the first learning unit 902, thereby updating, using the feature calculated from the collected data, the parameters called a dictionary for enabling the first detector 901 to detect the detection target 201. The positive and negative data used by the first learning unit 902 is determined using the detection result of the first detector 901. As shown in FIG. 10, feature acquired from a field 1001, 1011 corresponding to the detection result of the first detector 901 is set as the positive data used by the first learning unit 902, and feature calculated from a field 1012 that is obtained by upward, downward, rightward or leftward shifting the field 1001, 1011 by a randomly set value or values is set as the negative data used by the first learning unit 902.

The second learning unit 602 collects, from the image of the current frame obtained by the image acquisition unit 101, positive and negative data used by the second learning unit 602, and updates, using the feature calculated from the collected data, the parameters called a dictionary for enabling the second detector 601 to detect the detection target 201. The positive and negative data used by the second learning unit 602 is determined from the detection result of the second detector 601. As shown in FIG. 10, feature acquired from a field 1002, 1021 corresponding to the detection result of the second detector 601 is set as the positive data used by the second learning unit 602, and feature calculated from a field 1022 that is obtained by upward, downward, rightward or leftward shifting the field 1002, 1021 by a randomly set value or values is set as the negative data used by the first learning unit 902. To calculate the feature, the technique disclosed in, for example, the aforementioned document Tomoki Watanabe, Satoshi Ito and Kentaro Yokoi: "Co-occurrence Histograms of Oriented Gradients for Human Detection," IPSJ Transactions on Computer Vision and Applications, Vol. 2, pp. 39-47. (2010) is employed. Further, to update the dictionary, the technique called online learning, disclosed in, for example, Koby Crammer, Arex Kulesza, Mark Dredze: "Adaptive Regularization of Weight Vectors," Neural Information Processing Systems (2009)" is utilized.

Figure 11:
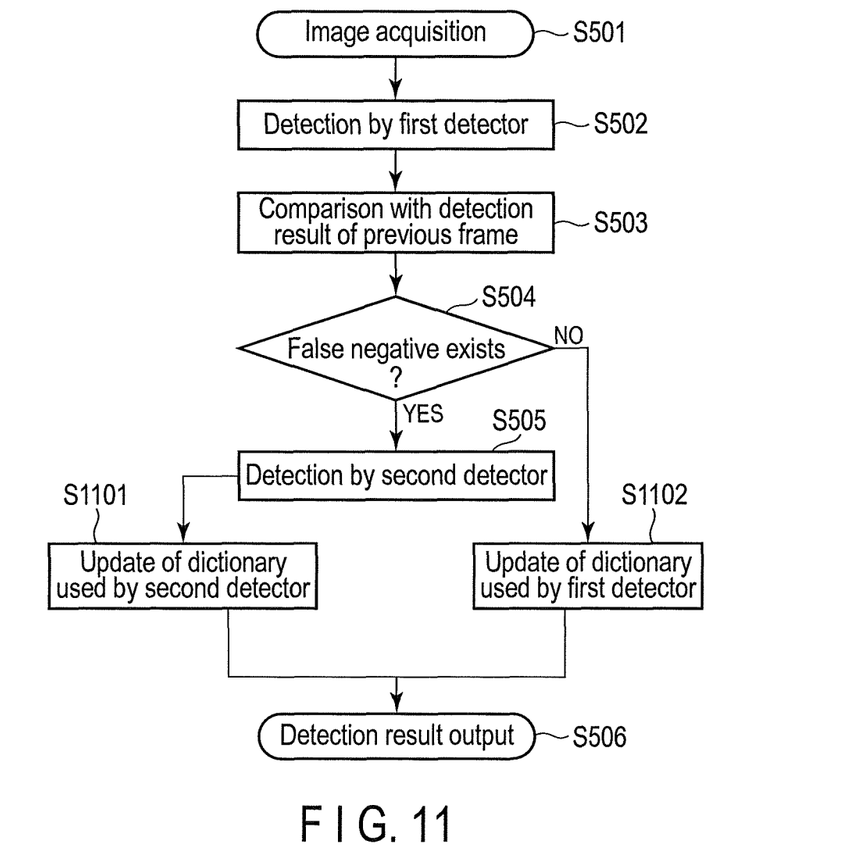
FIG. 11 is a flowchart illustrating the operation of the object detection apparatus according to the third embodiment.

Referring to FIG. 11, the operation of the object detection apparatus according to the third embodiment will be described. In FIG. 11, elements similar to those shown in FIG. 5 are denoted by corresponding reference numbers, and no detailed description will be given thereof. The operation of the object detection apparatus 900 of the third embodiment differs from that of the object detection apparatus 100 of the first embodiment in that in the former, updating of the dictionary used by the first detector 901 (S1102) and updating of the dictionary used by the second detector 601 (S1101) are added.

In the updating of the dictionary used by the first detector 901 (S1102), when the first detector 901 detects the detection target 201, the first learning unit 902 calculates a feature based on the field 1001 corresponding to the detection result of the first detector 901, and on the field 1012 near the field 1001, thereby updating the dictionary used by the first detector 901.

Similarly, in the updating of the dictionary used by the second detector 601 (S1101), when the second detector 601 detects the detection target 201, the second learning unit 602 calculates a feature based on the field 1002 corresponding to the detection result of the second detector 601, and on the field 1022 near the field 1002, thereby updating the dictionary used by the second detector 601.

In the third embodiment described above, since a plurality of detectors utilize different parts for detection, even when false negative exists in one of the parts, it can be detected in the other part, which can further suppress the number of occurrences of false negative, compared to the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object detection apparatus comprising:
   a camera which acquires a plurality of frames in a time-series manner;
   a first detector configured to detect a predetermined object in each of the frames;
   a determination unit configured to store detection results corresponding to the frames, to compare a first detection result corresponding to a first frame of the frames with a second detection result corresponding to a second frame of the frames acquired after the first frame, and to determine whether a false negative of the predetermined object exists in the second frame; and
   a second detector configured to detect the predetermined object in the second frame when it is determined that the false negative of the predetermined object exists, the second detector differing in performance from the first detector.

2. The apparatus according to claim 1, further comprising a storage configured to store a detection result of the first detector and a detection result of the second detector,
   wherein the determination unit compares the detection result of the second detector corresponding to the second frame, with the detection result of the first detector corresponding to a third frame acquired after the second frame, and determine whether a false negative of the predetermined object exists in the third frame.

3. The apparatus according to claim 1, wherein the determination unit employs a current frame as the second frame, employs, as the first frame, a previous frame before the current frame, and determines that the false negative exists in the current frame, when a first number of objects detected in the current frame is larger than a second number of objects detected in the previous frame.

4. The apparatus according to claim 1, wherein the determination unit employs a current frame as the second frame, employs, as the first frame, a previous frame before the current frame, and determines that the false negative of the predetermined object exists in the current frame, when a distance between a position of the predetermined object in the current frame, and a position of the predetermined object in the previous frame is larger than a threshold.

5. The apparatus according to claim 1, wherein the determination unit employs a current frame as the second frame, employs, as the first frame, a previous frame before the current frame, and determines that the false negative of the predetermined object exists in the current frame, when a ratio of a fourth area to a third area is smaller than a threshold, the third area being a sum set of a first area including the predetermined object detected in the previous frame and a second area including the predetermined object detected in the current frame, the fourth area being a product set of the first area and the second area.

6. The apparatus according to claim 1, wherein the determination unit employs a current frame as the second frame, employs, as the first frame, a previous frame before the current frame, and determines that the false negative of the predetermined object exists in the current frame, when a degree of similarity between a first color of the predetermined object detected in the current frame and a second color of the predetermined object detected in the previous frame, is smaller than a threshold.

7. The apparatus according to claim 1, further comprising a learning unit configured to update a parameter used for detection, using a feature calculated from a first area including the predetermined object in the second frame, and a second area including part of the predetermined object or excluding the predetermined object,
   wherein the second detector detects, using the parameter, whether each of the frames contains the predetermined object.

8. The apparatus according to claim 7, wherein the first area is detected by at least one of the first detector and the second detector, and the second area is obtained by randomly moving the first area.

9. The apparatus according to claim 7, wherein the learning unit updates the parameter by online learning.

10. The apparatus according to claim 2, wherein the determination unit employs a current frame as the second frame, employs, as the first frame, a previous frame before the current frame, and determines that the false negative exists in the current frame, when a first number of objects detected in the current frame is larger than a second number of objects detected in the previous frame.

11. The apparatus according to claim 2, wherein the determination unit employs a current frame as the second frame, employs, as the first frame, a previous frame before the current frame, and determines that the false negative of the predetermined object exists in the current frame, when a distance between a position of the predetermined object in the current frame, and a position of the predetermined object in the previous frame is larger than a threshold.

12. The apparatus according to claim 2, wherein the determination unit employs a current frame as the second frame, employs, as the first frame, a previous frame before the current frame, and determines that the false negative of the predetermined object exists in the current frame, when a ratio of a fourth area to a third area is smaller than a threshold, the third area being a sum set of a first area including the predetermined object detected in the previous frame and a second area including the predetermined object detected in the current frame, the fourth area being a product set of the first area and the second area.

13. The apparatus according to claim 2, wherein the determination unit employs a current frame as the second frame, employs, as the first frame, a previous frame before the current frame, and determines that the false negative of the predetermined object exists in the current frame, when a degree of similarity between a first color of the predetermined object detected in the current frame and a second color of the predetermined object detected in the previous frame, is smaller than a threshold.

14. An object detection method comprising:
acquiring a plurality of frames in a time-series manner;
detecting a predetermined object in each of the frames, using a first detector;
storing detection results corresponding to the frames, comparing a detection result corresponding to a first frame of the frames with a detection result corresponding to a second frame of the frames acquired after the first frame, and determining whether a false negative of the predetermined object exists in the second frame; and
detecting the predetermined object in the second frame using a second detector differing in performance from the first detector, when it is determined that the false negative of the predetermined object exists.

15. The method according to claim 14, further comprising storing, in a storage, a detection result of the first detector and a detection result of the second detector,
wherein the detection result of the second detector corresponding to the second frame is compared with the detection result of the first detector corresponding to a third frame acquired after the second frame, and it is determined whether a false negative of the predetermined object exists in the third frame.

16. The method according to claim 14, wherein a current frame is employed as the second frame, a previous frame before the current frame is employed as the first frame, and it is determined that the false negative exists in the current frame, when a first number of objects detected in the current frame is larger than a second number of objects detected in the previous frame.

17. The method according to claim 14, wherein a current frame is employed as the second frame, a previous frame before the current frame is employed as the first frame, and it is determined that the false negative of the predetermined object exists in the current frame, when a distance between a position of the predetermined object in the current frame, and a position of the predetermined object in the previous frame is larger than a threshold.

18. The method according to claim 14, wherein a current frame is employed as the second frame, a previous frame before the current frame is employed as the first frame, and it is determined that the false negative of the predetermined object exists in the current frame, when a ratio of a fourth area to a third area is smaller than a threshold, the third area being a sum set of a first area including the predetermined object detected in the previous frame and a second area including the predetermined object detected in the current frame, the fourth area being a product set of the first area and the second area.

19. The method according to claim 14, wherein a current frame is employed as the second frame, a previous frame before the current frame is employed as the first frame, and it is determined that the false negative of the predetermined object exists in the current frame, when a degree of similarity between a first color of the predetermined object detected in the current frame and a second color of the predetermined object detected in the previous frame, is smaller than a threshold.

20. The method according to claim 14, further comprising updating a parameter used for detection, using a feature calculated from a first area including the predetermined object in the second frame, and a second area including part of the predetermined object or excluding the predetermined object, wherein the detecting using the second detector comprises detecting, using the parameter, whether each of the frames contains the predetermined object.

* * * * *